A. CITROEN.
SUBMARINE STEERING APPARATUS.
APPLICATION FILED DEC. 19, 1913.

1,213,153.

Patented Jan. 23, 1917.

Fig.1.

A. CITROEN.
SUBMARINE STEERING APPARATUS.
APPLICATION FILED DEC. 19, 1913.

1,213,153.

Patented Jan. 23, 1917.
7 SHEETS—SHEET 2.

Fig.2.

A. CITROEN.
SUBMARINE STEERING APPARATUS.
APPLICATION FILED DEC. 19, 1913.

1,213,153.

Patented Jan. 23, 1917.
7 SHEETS—SHEET 4.

Fig. 4.

WITNESSES

INVENTOR

A. CITROEN.
SUBMARINE STEERING APPARATUS.
APPLICATION FILED DEC. 19, 1913.

1,213,153.

Patented Jan. 23, 1917.
7 SHEETS—SHEET 5.

WITNESSES
INVENTOR

A. CITROEN.
SUBMARINE STEERING APPARATUS.
APPLICATION FILED DEC. 19, 1913.

1,213,153.

Patented Jan. 23, 1917.
7 SHEETS—SHEET 7.

WITNESSES
E. L. Schuermann.
H. S. Morris.

INVENTOR
André Citroen
by Pennie Goldsborough O'Neill
Attys

UNITED STATES PATENT OFFICE.

ANDRÉ CITROEN, OF PARIS, FRANCE, ASSIGNOR TO SOCIETE ANONYME DES ENGRENAGES CITROEN, OF PARIS, FRANCE, A CORPORATION OF FRANCE.

SUBMARINE STEERING APPARATUS.

1,213,153. Specification of Letters Patent. Patented Jan. 23, 1917.

Application filed December 19, 1913. Serial No. 807,761.

*To all whom it may concern:*

Be it known that I, ANDRÉ CITROEN, citizen of the French Republic, residing at Paris, Department of the Seine, in France, have invented certain new and useful Improvements in Submarine Steering Apparatus; and I do hereby declare the following to be a full, clear, and exact description of the invention, such as will enable others skilled in the art to which it appertains to make and use the same.

In rudder controlling gear hitherto employed a definite or fixed ratio has generally existed between the movement of the driving member and the annular movements of the rudder shaft. In one type of control however, a very slight difference of ratio is afforded and this has been accomplished by means of two nuts but this difference of ratio acted detrimentally to the facility of operation of the gear.

In submarines provided with a steering rudder or with a plurality of immersion rudders, it has previously been necessary to have recourse to a separate engine for operating each rudder, the motors generally employed being electric and driven by batteries of accumulators presenting a very small internal resistance, which involves the inconvenience of making very large demands upon the current at each of the innumerable startings of the motors which are necessary during maneuvers. A further disadvantage resides in the fact that the steering rudder in such devices necessitates the employment of a more powerful motor than the motors for the immersion rudders.

The present invention has for its object to remedy these various defects by the modification of the ratio of the angular velocities of the rudder shaft, and the control member, in such a manner as to reduce the power necessary for the maneuver in the positions of the after piece of the rudder in which it is greatest and to permit of the employment of a single electric motor running continuously for independently operating a plurality of different rudders.

An embodiment of the invention as applied to a submarine vessel is illustrated by way of example in the accompanying drawing, in which.

The couple to be overcome for operating a rudder of rectangular cross-section is given by the formula:

$$C = KSV^2 \sin i \left(1 - \frac{L'}{L} \frac{1}{0.2 - 0.3 \sin i}\right)$$

in which K is a constant coefficient, S the surface of the after piece of the rudder, V the velocity of the ship, L the length of the after piece of the rudder and L' the distance between the axis of the rudder shaft and the front edge of the after piece of the rudder. The angle $i$ varies between 0° and 33° as a larger angle produces no greater effect in changing the direction of the ship. The couple therefore increases with the angle $i$. In the device in accordance with the present invention the control does not act upon the rudder shaft itself through a transmission with a constant velocity ratio in order that the demands made upon the operating motor may not be excessive when the angle $i$ approaches its maximum. The rudder shaft 1 carries an arm 2 which is provided with a slot. In this slot a slide block 3 travels; this block receives the trunnion or stud 4 of a member 5 forming a crank and rotating around an auxiliary shaft 6. This member 5 receives the mechanical control of constant angular velocity, either through an endless screw and worm wheel, as indicated or by miter gear-wheels, comprising a pinion 7 with a very small number of teeth cut in its shaft and meshing with a sector 5' also provided with miter teeth and rigid with the member 5. This pinion 7 or the endless screw (as the case may be) are controlled by bevel pinions which are also provided with miter teeth 8—9 which permit of connecting the apparatus with a line of shafting and Cardan joints 10 connecting up the motor and to the actuating device hereinafter described.

Figure 2:
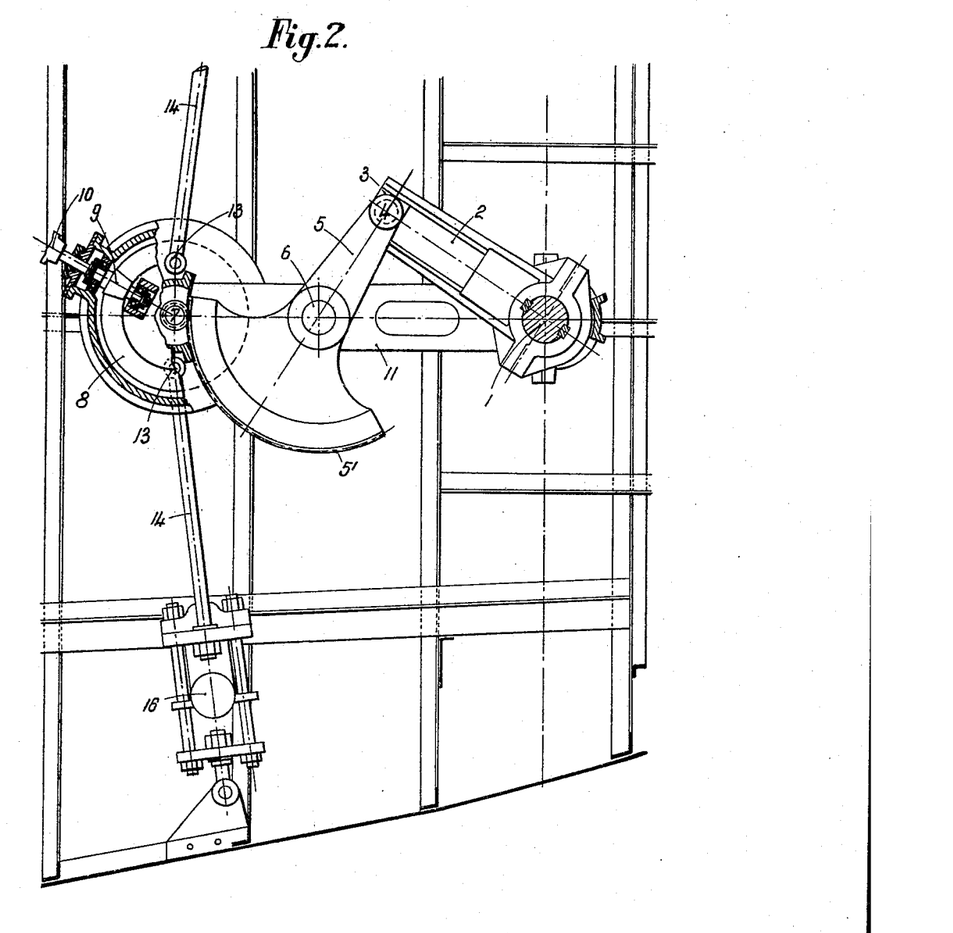
Fig. 2 is a plan view, partly in section, of the construction shown in Fig. 1.

The slot in arm 2 and the crank 5 are arranged in such a manner that, for the maximum angle of inclination of the after piece of the rudder to the axis of the ship, the block 3 of the stud 4 is situated at the extremity of the slot in arm 2, the axis of the slot in arm 2 and of the member 5 being substantially perpendicular as represented in Fig. 2. It follows that the couple necessary for the operation is *nil*, apart from friction, not only in the axial position of the arm 2 in which the angle $i$ is zero, but also in its extreme position. Between these two positions this couple passes through a maximum value which is less than the maximum value of the couple upon the rudder shaft proper.

Figure 9:
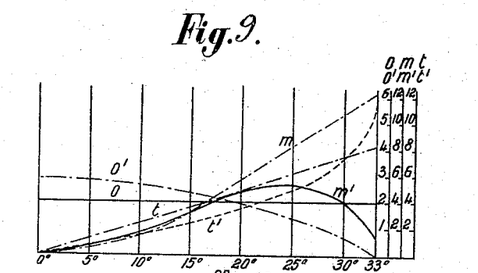
Fig. 9 shows a plurality of curves to be hereinafter described.

The calculation based upon the relative velocities of the rudder shaft 1 and of the auxiliary shaft 6 shows that upon the auxiliary shaft the maximum couple (whose curve $m'$ is represented in Fig. 9 as a function of the inclinations of the after piece of the rudder to the axis of the ship) is but very little greater than one half the couple upon the rudder shaft, the curve of which is indicated at $m$ in Fig. 9. The ratio of the angular velocities of the auxiliary shaft 6 and of the rudder shaft is not constant. If the rudder shaft 1 were directly controlled, and if its angular velocity, which would consequently be constant (in which case it would be represented by the straight line 0) were 4° per second, and if the device in accordance with the present invention were applied, notwithstanding the great reduction of the motor couple, the angular velocity would be raised to 6° per second in the axial position and diminish progressively. For an angle of 20° it would be 4° for example and 1° 36' for an angle of 30° and would only become zero for an angle of 33°. The curve of this angular velocity is indicated by the line $0'$. Finally, in proceeding from the axial position, the necessary duration indicated by the curve $t'$ upon the same figure in order to attain a given angular position, is less than it would be with the ordinary control system, this duration being represented by the curve $t$, as far as the angle of 30° approximately, after which it would become greater. The calculation that has been given has been established for the value of the ratio $$\frac{L'}{L} = 0.02.$$

Figure 1:
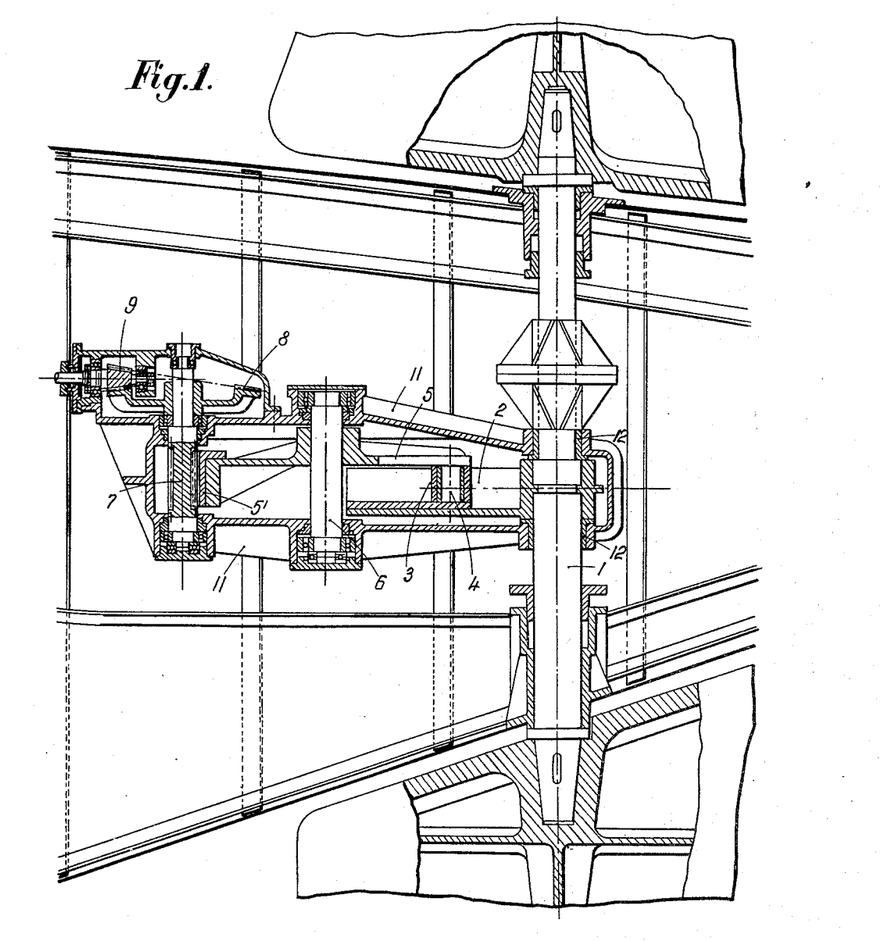
Figure 1 illustrates in vertical elevation, partly in section, the controlling mechanism for the steering rudders.
Figure 3:
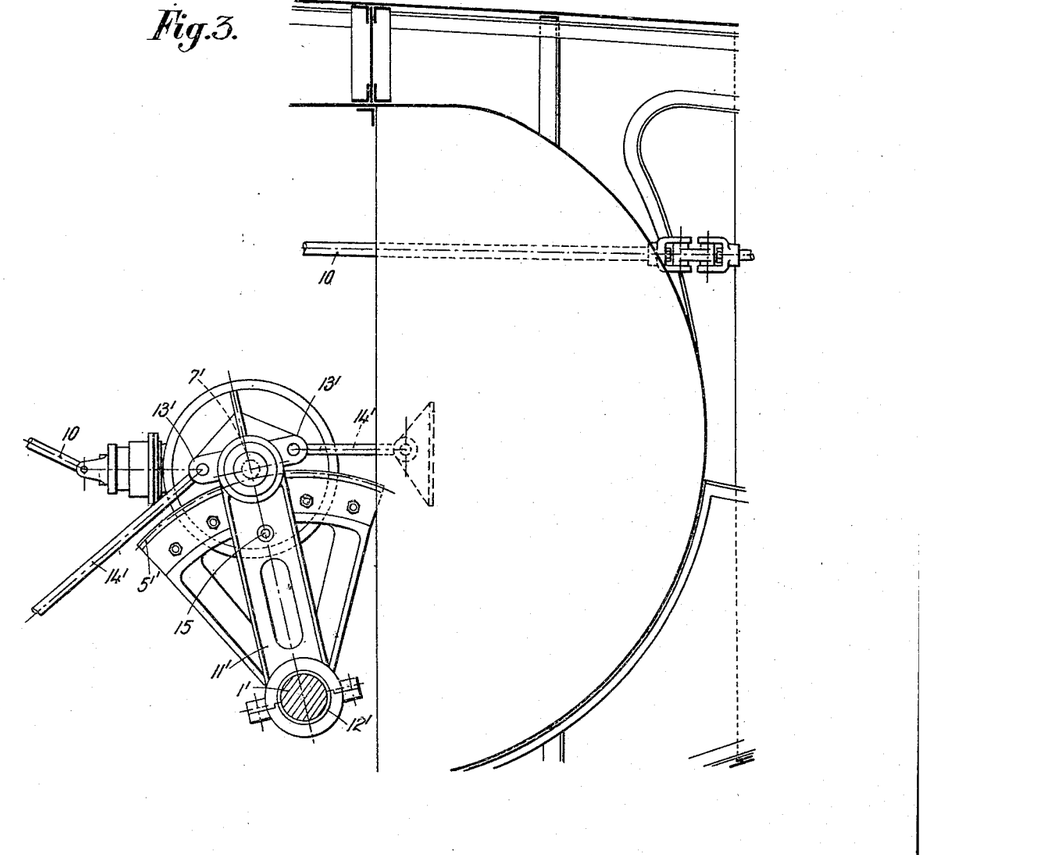
Fig. 3 is a vertical elevation of the controlling mechanism for the immersion rudders showing the horizontally disposed rudder shaft in section.
Figure 4:
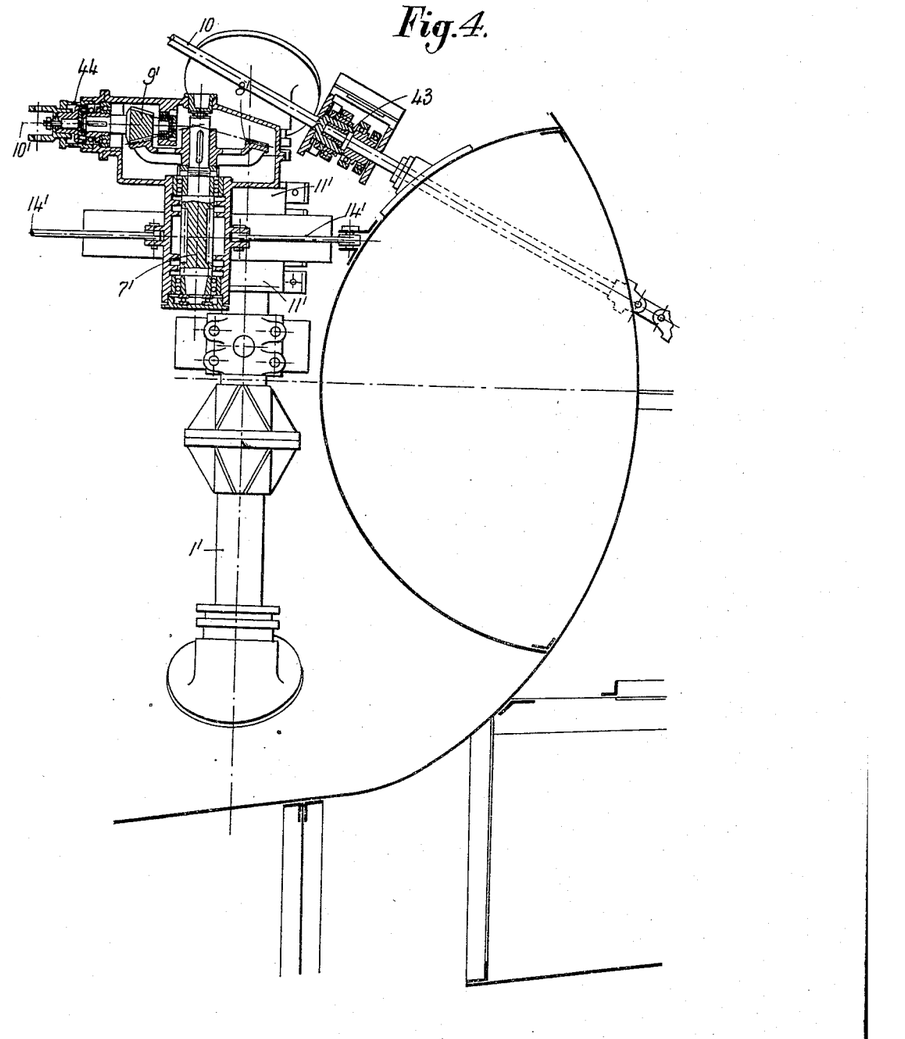
Fig. 4 is a plan view, partly in section, of the construction shown in Fig. 3.

In the accompanying drawings, the control mechanism for an immersion rudder is also illustrated with proportional control by means of miter gears similar to those shown in Figs. 1 and 2 for the steering rudder. A factor which constitutes a characteristic common to the two types of actuation, is that the constituent elements are all supported by a frame 11, 11' resting upon the rudder shaft itself by means of two bearings 12, 12 in such a manner that the position of the several elements of the transmission, the extent to which the gears mesh and so forth cannot be influenced by the deformations of the hull as would be the case if each of the several elements were supported by a support fixed separately to the hull. By the employment of this frame, which would rotate freely about the rudder shaft, there would be nothing to constitute a point of support for the transmission of the strain. The frame 11, 11' carries lugs 13, 13' to which rods 14, 14' are pivoted; these rods bear upon the hull either by the intermediary of a set of Belleville washers or by the intermediary of a hydro-pneumatic brake cylinder 16 (Fig. 2). The washers of the hydro-pneumatic brake are adjusted to absorb the values of the couple around the rudder shaft exceeding the limit permitted for the transmission. If the calculation based upon the knowledge of the dimensions, the form, the ratio of the front area to the total area of the after piece of the rudder, and of the total velocity of the ship permits of estimating the maximum couple that the transmission elements will have to overcome, it may also happen that a mass of water or the waves acting upon the after piece of the rudder will momentarily produce a greater couple the value of which cannot be exactly foreseen and from which the parts must be protected in order to insure their preservation. The employment of the hydro-pneumatic brake, or of the Belleville washers upon the anchoring rods, permits of absorbing these couples directly. The after piece of the rudder then yields to them and when the cross wave has passed, it returns by the elasticity of the washers or of the air to its previous position. The employment of this device is particularly useful for the steering rudder which is employed when maneuvering on the surface. As regards the immersion rudders, during immersion they have not to withstand the impact of any waves as they are completely immersed and, during navigation on the surface, they can be locked by pin 15 (Fig. 3) in any suitably selected angular position in which they constitute bilge keels and, when running at high speeds tend to raise the ship in the water in a favorable position for obtaining a high velocity with a smaller expenditure of energy. During immersion the pins 15 are removed and they need only be placed in position for surface navigation and in bad weather, or when navigating on the surface at full speed.

Figure 6:
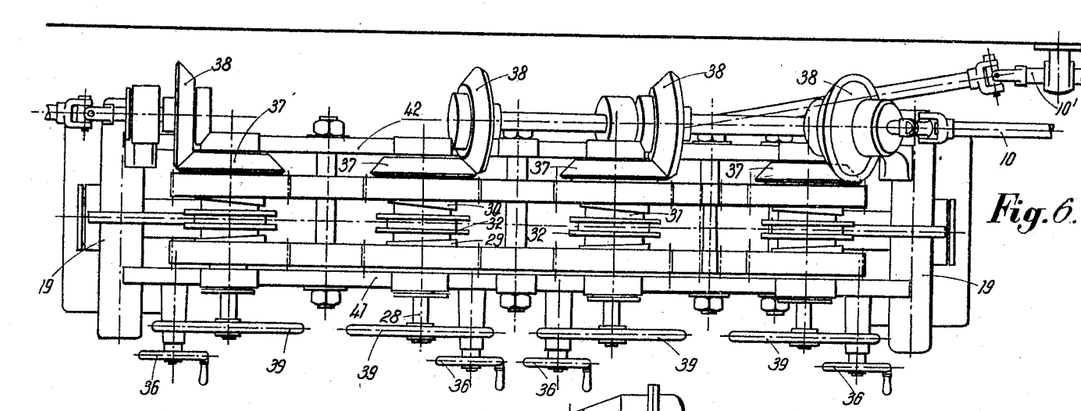
Fig. 6 is a more or less diagrammatic plan view of the construction shown in Fig. 5.
Figure 7:
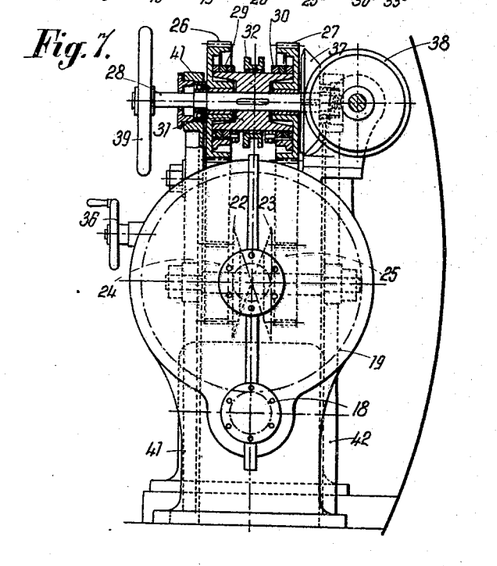
Fig. 7 is a vertical section, taken on the line A—A of Fig. 5.
Figure 8:
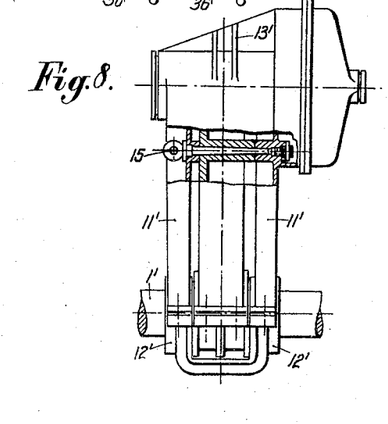
Fig. 8 is a front elevation of a portion of the controlling mechanism shown in Fig. 3, certain parts being broken away to show the locking pin hereinafter described.

The common control of the several rudders (Figs. 5, 6 and 7) of a submarine in accordance with the present invention, is effected by means of a single electric motor 17; nevertheless as a measure of precaution a second motor 17' may be provided as reserve and run constantly with half lead simultaneously with the first motor; in case of injury one of these motors can be uncoupled.

By the intermediary of a resilient clutch sleeve each of these motors drives a speed reducing gear 18—19. The shaft 20 of the low speed wheel 19 receives a bevel pinion 21 which meshes with two bevel pinions 22—23 loose upon a shaft but each of which is rigid with a cylindrical gear wheel 24—25. By means of a series of cylindrical intermediate gear wheels, these gear wheels which rotate in opposite directions, drive gear wheels 26—27 loose upon the shafts 28. The gear wheels 26—27 are provided with steel spirals 29—30 forming part of a double progressive clutch, these spirals are arranged to drive a collar 31 keyed upon the shaft 28 and with this object a collar 32, operated by a fork 33, a nut 34 and a screw 35 integral with a fly wheel and crank 36, presses one or other of the spirals against the collar, according to the direction in which it is displaced.

Figure 5:
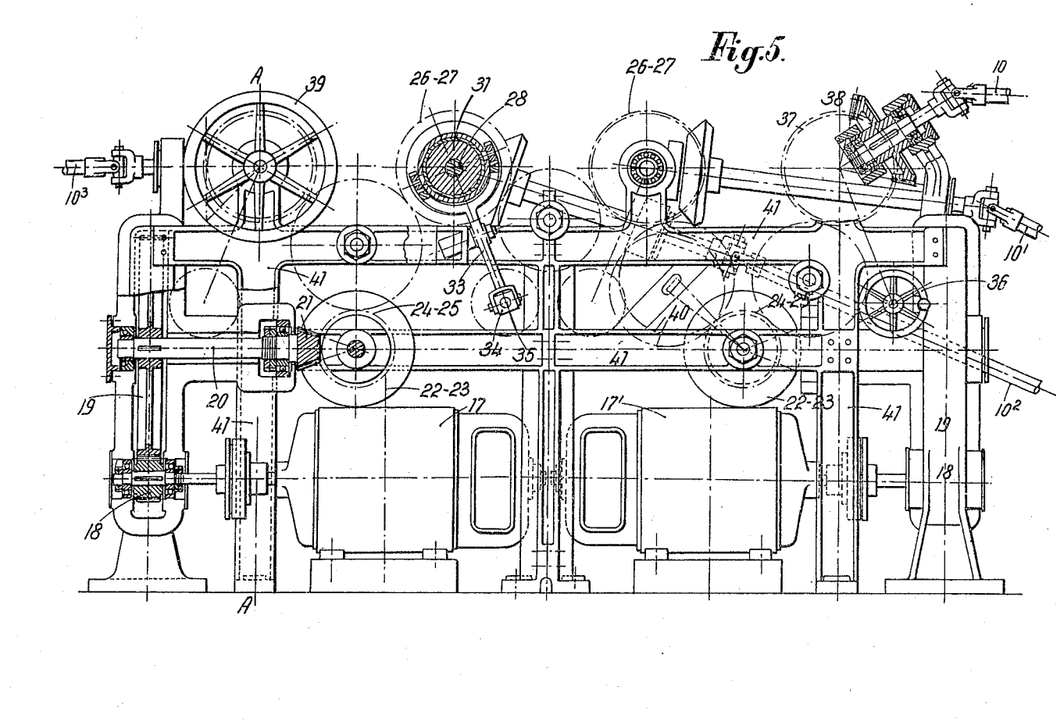
Fig. 5 is a more or less diagrammatic elevation, partly in section, of the actuating station from which the rudders are operated.

The shaft 28 carries a bevel pinion 37 which drives a second gear wheel 38 keyed upon the extremity of the line of shafting and of Cardan joints which drives the pinion operating the apparatus mounted upon the shaft of the rudder. The shaft 28 carries a hand-wheel 39 of large diameter which provides for operating the rudder by hand, in case both the motors 17, 17' should become inoperative. Every rudder control being similarly arranged, Fig. 5 represents a station comprising four mechanisms, one for the steering rudder and three for the immersion rudders.

A pair of the intermediate gear wheels above mentioned are adapted to be thrown out of operation to throw the actuating means for all of the immersion rudders out of operation when the motor 17' is being used. These gears are shown at 40 and are mounted to swing about the axis of the gears 24—25. In one extreme position of the gears 40, they mesh with the gears 26—27, and in the other extreme position, they are out of mesh with said gears 26—27. As they swing about the axis of the gears 24—25, they are obviously always in mesh with these gears 24—25. When the motor 17' is being used alone, and the gears 40 are in their operative position, it is obvious that all of the rudders may be operated from the motor 17'. When said gears 40 are in their inoperative position, however, only the steering rudders can be operated through the intermediary of the shaft 10 from the motor 17', as the gears 40 serve as the only operative connection between the motor 17' and all of the gears associated with the actuating mechanism for the immersion rudders. Furthermore, when the gears 40 are in their operative position, there is a continuous train of gearing between each motor and all of the Cardan shafts which operate the rudders. Therefore, either motor may be used to actuate all of the rudders.

It will be understood that in addition to the four operating mechanisms represented, identical mechanisms can be provided for actuating the periscopes, the capstan, and so forth.

All the gears of the operating station are mounted between two parallel frames 41—42 arranged longitudinally against the wall of the station. Tell-tale signals can be installed above each operating gear to notify the helmsman of the actual position of the after pieces of the rudders. When, as shown in the example illustrated, the control is by gear-wheels and not by screws, locking devices should be interposed to prevent the after pieces of the rudders from shifting when the hand control has been released or the electric control thrown out. For the steering mechanism of a submarine, which is generally located in a water ballast tank accessible to the sea water, the locking mechanism 43 is arranged immediately after the stuffing box in which the transmission shaft passes through the inner hull, while for the immersion mechanisms this locking mechanism 44 is rendered integral with the frame and the driving pinion because the immersion mechanisms are located entirely in the inner hull.

The invention is not limited to the constructional forms illustrated and it comprises in particular all controls for the main piece of the rudder in which the angular velocity of the latter is not proportionate to that of the control member. For example the slot gear can be replaced by an eccentric or a cam system of any appropriate construction.

I claim:

1. In steering mechanism for ships and the like, the combination with a rudder shaft, of a frame mounted on the shaft, actuating mechanism for said shaft supported by the frame, and means to brace the frame and prevent the same from freely swinging about the axis of said shaft.

2. In steering mechanism for ships and the like, the combination with a rudder shaft, of a frame mounted on the shaft, actuating mechanism for said shaft supported by the frame, and means to yieldingly brace the frame and prevent the same from freely swinging about the axis of said shaft.

3. In combination with a submarine or the like, of a series of rudders for steering and submerging, and a motor for controlling each or all of said rudders separately or simultaneously.

4. In combination with a submarine or the like, of steering and submerging rudders, a motor for operating each or all of said rudders through their respective actuating means, said means comprising a main rudder shaft, means to impart relatively slow movements to the rudder shaft when the resistance offered thereby is relatively great and to impart faster movements to said rudder shaft when the resistance offered thereby is relatively small.

5. In combination with a submarine or the like, a series of steering and submerging rudders, a motor for operating each or all of said rudders through their respective actuating means, said means comprising a main rudder shaft, an auxiliary rudder shaft, means to impart a constant angular velocity to the auxiliary shaft, connections between the auxiliary shaft and the main rudder shaft to impart to the latter an inconstant angular velocity, the displacement being relatively slow when the rudder makes a relatively large angle with the axis of the ship and relatively fast when the rudder makes a relatively small angle with the axis of the ship, and means for locking said rudder in any desired position.

In testimony whereof I affix my signature, in presence of two witnesses.

ANDRÉ CITROEN.

Witnesses:
 HANSON C. COXE,
 EMILE KLOTZ.

Copies of this patent may be obtained for five cents each, by addressing the "Commissioner of Patents, Washington, D. C."